United States Patent [19]
Bou et al.

[11] Patent Number: 5,861,207
[45] Date of Patent: Jan. 19, 1999

[54] ACTIVE COMPOSITE WITH FOLIATED STRUCTURE AND ITS USE AS REACTION MEDIUM

[75] Inventors: Pierre Bou, Soisy Sous Montmorency; Michel Moreau, Clichy; Philippe Prades, Perpignan, all of France

[73] Assignees: Elf Aquitaine; Le Carbone Lorraine, both of France

[21] Appl. No.: 621,191

[22] Filed: Mar. 21, 1996

[51] Int. Cl.[6] .................. B44F 1/10; B32B 3/26; B32B 9/00; B32B 15/08
[52] U.S. Cl. .................... 428/312.2; 264/29.1; 428/408; 502/416; 502/417
[58] Field of Search .................. 428/408, 332, 428/312.2; 106/448; 264/29.1; 502/416, 417

[56] References Cited

U.S. PATENT DOCUMENTS

| | | | |
|---|---|---|---|
| 3,719,608 | 3/1973 | Olstowski | 252/506 |
| 4,852,645 | 8/1989 | Coulon et al. | 165/180 |
| 4,906,258 | 3/1990 | Balat et al. | 55/74 |
| 5,086,022 | 2/1992 | Roca et al. | 502/60 |
| 5,100,737 | 3/1992 | Colombier et al. | 428/612 |
| 5,283,219 | 2/1994 | Mauran et al. | 502/417 |
| 5,554,348 | 9/1996 | Bauer | 422/211 |

FOREIGN PATENT DOCUMENTS

| | | | | |
|---|---|---|---|---|
| 2 546 278 | 11/1984 | France | | C09K 5/00 |

*Primary Examiner*—Jose G. Dees
*Assistant Examiner*—Alton Pryor
*Attorney, Agent, or Firm*—Bacon & Thomas, PLLC

[57] ABSTRACT

Active composite consisting of a compressed support and of at least one agent which is active towards a gas, the compressed support including recompressed expanded graphite which has a density of between 0.02 and 1.5. According to the invention the active composite is made up of a series of sheets superposed one above the other, the active agent being dispersed in the flakes.

29 Claims, 2 Drawing Sheets

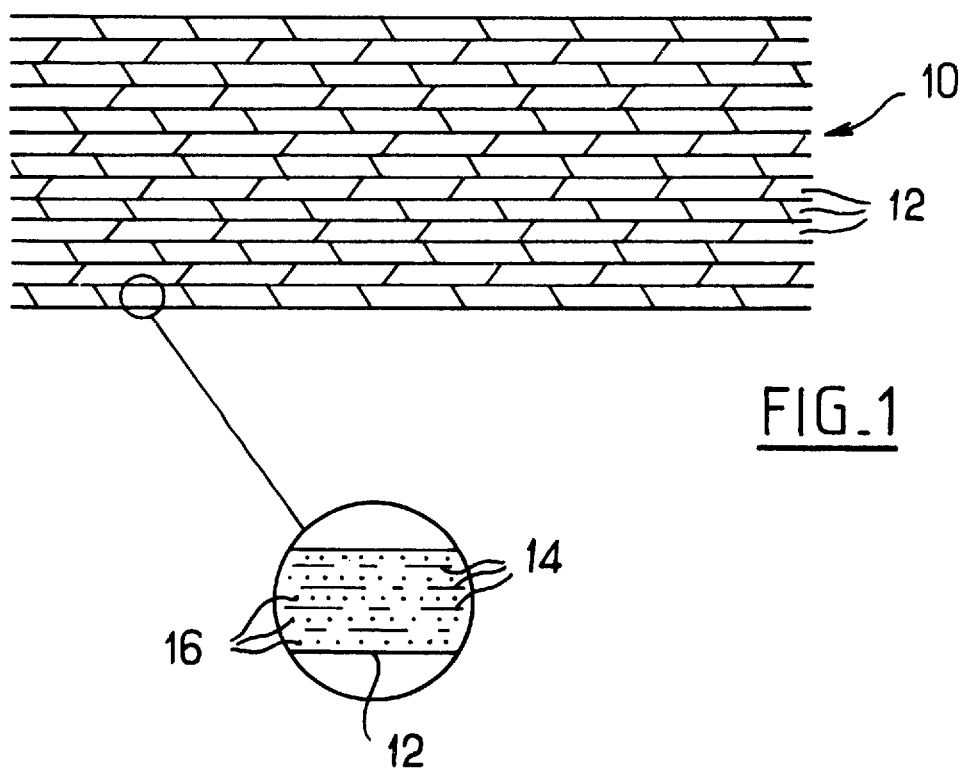

ACTIVE COMPOSITE WITH FOLIATED STRUCTURE AND ITS USE AS REACTION MEDIUM

BACKGROUND OF THE INVENTION

1. Field of the Invention

The present invention relates to an active composition with foliated structure, consisting of a compressed support in the form of sheets and of an agent which is active towards a gas. The present invention also relates to a process for making use of a gas-solid or gas-liquid physicochemical process employing such an active composite as reaction medium.

2. Description of Related Art

A mixture of a divided material such as expanded graphite and of a solid reactant, for example a salt, or an adsorbent like a zeolite is employed in some fields like, for example, that of chemical heat pumps based on the thermicity of the reaction between a solid and a gas, or the adsorption of a gas on a solid. The mixture of expanded graphite and of this solid, the seat of a chemical reaction or of a physical adsorption, exhibits numerous advantages during a chemical reaction or a physical adsorption between the solid and a gas. Expanded graphite which is in the form of flakes or of foliated particles has a very large specific surface and allows the gas to diffuse even in a confined medium.

The substantial improvement in the reversible solid-gas reaction kinetics which is observed as a result of the mixing of the active solid with thermally expanded natural graphite, in given mass proportions and compacted into a fixed volume, is the result of an excellent permeability to the reactant gas of the stationary bed thus prepared and of a thermal conductivity accompanied by a good heat exchange coefficient at the walls. Conventionally, the preparation of such a reactant produces a homogeneous isotropic bed whose isotropic conductivity has values of 0.5 to 2 $Wm^{-1} K^{-1}$, depending on the preparation conditions (proportion and compacting), and whose exchange coefficient at the walls lies between 50 and 150 $Wm^{-2} K^{-1}$.

Despite these advantages the use of such mixtures in the granular states presents disadvantages because of the difficulty in obtaining really homogeneous mixtures, of their being difficult to handle and of the large volume which they occupy. Furthermore, the reactant, frequently hygroscopic, tends to absorb moisture if the mixing operation is long; a subsequent dehydration is long, or even costly, and can affect the quality of the final product, even after dehydration.

Document WO91/15292 describes an active composite in the form of a homogeneous block which includes recompressed expanded graphite subsequently impregnated with an active agent, for example a salt. This type of active composite exhibits considerable advantages when compared with the pulverulent mixtures containing expanded graphite and described above, but, nevertheless, it is difficult to produce. These difficulties relate more particularly to the distribution of the salt in the block in a uniform manner. Furthermore, the recompression of the expanded graphite typically takes place in a piston-and-cylinder unit, which gives blocks of exclusively cylindrical shape. Some applications of the actual composite call preferably for shapes other than cylinders.

The processes for the manufacture of expanded graphite are well known, in particular from U.S. Pat. No. 3,404,061. These processes, known as graphite exfoliation, include a stage of rapid expansion by heating a graphitic complex which produces a graphite powder expanded in vermicular form.

SUMMARY OF THE INVENTION

The subject of the present invention is therefore an active composite with foliated structure, which offers an excellent permeability to a gas flow and has good thermal conductivity properties, while being easy to produce.

To do this, the invention proposes an active composite consisting of a compressed support and of at least one agent which is active towards a gas, the compressed support including recompressed expanded graphite which has a density of between 0.02 and 1.5 characterized in that the active composite is made up of a series of sheets superposed over one another, the active agent being dispersed in the sheets.

According to a preferred embodiment the active composite with foliated structure includes from 5 to 95% by weight of recompressed expanded graphite and from 95 to 5% by weight of active agent.

The invention also proposes a process for making use of solid-gas or solid-liquid physicochemical processes, characterized in that it employs as reaction medium an active composite consisting of a compressed support and of an agent which is active towards a gas, the compressed support including recompressed expanded graphite which has a density of between 0.02 and 1.5 and including a series of sheets superposed over one another, the active agent being dispersed in the sheets.

Such an active composite is intended to be employed for making use either of a reaction of solid-gas type or an adsorption between a gas and a solid or the absorption of a gas in a liquid, for example a saturated or unsaturated solution of a solid, or a solid-catalysed reaction between a gas and a liquid, or the seat of a condensation/evaporation of a gas, or, finally, the solid-catalysed conversion reaction of a gas. Thus, the present invention proposes a process for making use either of reactions of the gas-solid type or of gas-solid adsorption, or of absorption of a gas in a liquid, or, finally, of catalytic conversion of a gas, by employing as reaction medium a block of active composite according to the invention.

The active composite according to the invention must exhibit a very high heat-transfer anisotopy which will result from the ordered compression of the graphite flakes, which are very good heat conductors, while preserving a high porosity permitting a good diffusion of the gas as far as each active site, arranged substantially uniformly in the composite.

The active composite according to the invention, whose density is between 0.02 and 1.5 exhibits a high thermal-conductivity anisotropy, that is to say that the thermal conductivity $C_1$ in a first direction $D_1$ of the active composite is markedly higher than that obtained in another direction $D_2$ of the composite, which is perpendicular to the first. The active composite according to the invention has an anisotropy coefficient, which is the ratio $C_1/C_2$, of between 3 and 150 and preferably between 10 and 100.

Furthermore, the active composite according to the invention must exhibit some porosity allowing the gases to reach the active sites.

The total porosity of the composite corresponds to the percentage of voidage within the said composite, which is easily obtained from its measured density, compared with the relative density of natural graphite: 2.2.

The important characteristic of the composite is the open porosity which represents the accessibility of the active sites to the liquids and gases. This open porosity is expressed as a percentage of the total porosity. It is determined by measuring the quantity of water, maintained at atmospheric pressure and absorbed by the block to which a pressure of 0.02 bar is applied.

The open porosity of the composite is generally between 32 and 99.1% of its total porosity. Within this range it will depend to a large extent on the composite density which is chosen for the envisaged application.

Other characteristics and advantages of the present invention will appear more clearly on reading the following description, given with reference to the attached drawings:

BRIEF DESCRIPTION OF THE FIGURES OF DRAWING

FIG. 1 is a diagrammatic sectional view of an active composite with foliated structure according to the invention;

FIG. 1a is a detailed view of a constituent part of FIG. 1; and

DETAILED DESCRIPTION OF THE PREFERRED EMBODIMENT

Figure 2A:
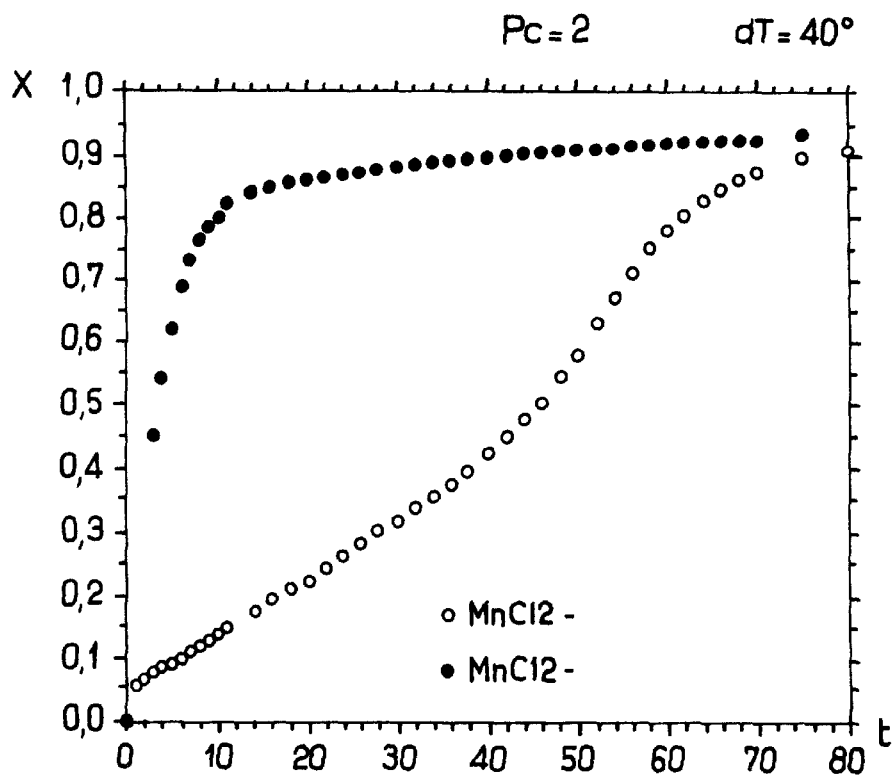
FIGS. 2a and 2b are curves of the reaction characteristics of active composites according to the invention and according to the prior art.

As shown in FIG. 1, an active composite with foliated structure 10 is made up of a number of sheets 12 of analogous structure which are superposed over one another. Each sheet is produced from expanded graphite in pulverulent form which is compressed by rollers in order to form a compressed support for the active agent. The compression takes place in several stages, the density of the sheet produced increasing at each stage. After one or more compression stages the sheet is impregnated with active agent. This impregnation may be performed, for example, by immersing the sheet in a solution of the reactive agent and then drying the impregnated sheet in order to leave the active agent dispersed in the sheet. The sheet is preferably recompressed after the drying operation.

During the recompression of the expanded graphite the flakes of graphite become aligned. This structure is illustrated in FIG. 1a, which shows flakes 14, arranged in parallel, between which the salt crystals 16 are dispersed.

The production of a sheet 12 impregnated with active agent is performed continuously. The continuous sheet is next cut up in order to create numerous sheets of similar dimensions, which are superposed as shown in FIG. 1. The group of superposed sheets may be optionally subjected to a new compression.

It is thus possible to produce an active composite with foliated structure whose dimensions and shape can be easily chosen.

The active composite with foliated structure according to the invention may be produced from numerous different active agents such as those proposed, for example, in Table I. An active agent is intended to mean, for example, a reactive solid, an absorbent solid, an absorbent liquid or a solid acting as catalyst.

TABLE I

| Nature of the active agent-gas interaction | Active agents | Gas |
| --- | --- | --- |
| Solid-gas reactions (reversible) | Halides | Water |
| | Pseudohalides | $NH_3$ and derivatives (amines) |
| | Carbonates | |
| | Sulphates | |
| | Nitrates | |
| | Oxides | $CO_2$ |
| | | $SO_2$ |
| | | $SO_3$ |
| | Metals, metal alloys | $O_2$ |
| | | $H_2$ |
| | | Hydrocarbons |
| | Metal hydrides | $H_2$ |
| Liquid-gas absorption (reversible) and saturated liquid-gas absorption (reversible) | Aqueous solutions | Water |
| | Halides | |
| | Pseudohalides | |
| | Carbonates | |
| | Sulphates | |
| | Nitrates | |
| | Solutions in liq. $NH_3$ | $NH_3$ and derivatives |
| | Halides | |
| | Pseudohalides | |
| | Carbonates | |
| | Sulphates | |
| | Nitrates | |
| Solid-gas adsorption (reversible) | Zeolite | Water |
| | Active carbon | Methanol and derivatives |
| | Silica gel | |
| | Phosphorus pentoxide | |
| Heterogeneous catalysis | $Ni + C_6H_6$ | $H_2$ |

In the case where the compressed support is intended to be impregnated with chlorides, Table II specifies the nature of impregnating liquids solubilizing the active agent or suspending it.

TABLE II

| Active agent | Impregnating liquid | |
| --- | --- | --- |
| | for solubilizing | for suspending |
| $CaCl_2$ | Water or alcohol, acetone | |
| $MnCl_2$ | alcohol | ether, liquid $NH_3$ |
| $BaCl_2$ | alcohol | liquid $NH_3$ |
| $NiCl_2$ | alcohol, $NH_4OH$ | |
| $CuCl_2$ | acetone | |
| $CoCl_2$ | alcohol, acetone, ether | liquid $NH_3$ |
| $SrCl_2$ | alcohol, acetone | |
| NaCl | glycerine | ether |
| $FeCl_2$ | alcohol, acetone | acetone, ether |
| $NH_4Cl$ | alcohol, liquid $NH_3$ alcohol | acetone, ether |
| $CdCl_2$ | | |

EXAMPLE 1

A block of active composite for a chemical heat pump, coded R1, was manufactured according to the prior art. To do this, an expanded natural graphite powder was obtained according to the process described in U.S. Pat. No. 3,404,061. This powder was next compressed in a mould to a density of 0.2 and then impregnated with an aqueous solution of $MnCl_2$. The impregnation was performed in an autoclave at a pressure of 6 bars after a primary vacuum was produced. The salt content in the composite block was 55% by weight. The block of active composite thus obtained was finally dried at 220° C. for 48 hours. The block was cylindrical in shape, with a height of 100 mm and a diameter of 150 mm.

A second active composite, according to the invention, for a chemical heat pump, coded R2, was manufactured. To do this, an expanded natural graphite powder was prepared according to a process comparable with that employed for manufacturing the block of active composite according to the prior art. This expanded natural graphite powder was next subjected to a pre-densification to a density of 0.03 and a thickness of 10 mm, in a first rolling mill, and then to an impregnation stage by continuous spraying of an aqueous solution of $MnCl_2$ containing Teepol (R) as wetting agent, then a stage of drying in a conveyor oven at 220° C. for approximately 30 minutes, and then a final densification stage to a graphite density in the composite of 0.2 and a thickness of 1.5 mm, in a second rolling mill. The strip thus obtained was then coated with a matt carbon finish and then cut up into discs of 150 mm diameter, pierced in the centre with a hole of 5 mm diameter, thus forming sheets of base composite. An active composite was finally obtained by stacking 67 sheets. The nature and content of the reactive salt were the same as for the block of active composite according to the prior art.

The two products were put on test in the same reactor and in the same conditions. A series of 20 cycles of synthesis and decomposition were carried out with an 80% conversion of the synthesis reactions, in the same thermodynamic pressure and temperature conditions applied to the reactor. The conductivities at the beginning of synthesis (S) and at the beginning of decomposition (S'), the contact coefficients at the reactor wall at the beginning of synthesis (C) and at the beginning of decomposition (C') and the times for 80% synthesis (T) and for complete decomposition (T') were measured.

The results obtained are shown together in the table below.

|  | R1<br>Prior art | R2<br>Invention |
| --- | --- | --- |
| S (W/mK) | 18 | 25 |
| S' (W/mK) | 17 | 18 |
| C (W/m$^2$K) | 70 | 480 |
| C' (W/m$^2$K) | 1800 | 3800 |
| T (min) | 20 | 12 |
| T' (min) | 80 | 24 |

EXAMPLE 2

A block of active composite according to document WO91/15292 was produced, the recompressed expanded graphite having a density of 0.166 before impregnation. This block contained 63% by weight of $MnCl_2$. An active composite according to the invention was also produced with a graphite density of 0.16 before impregnation. This active composite contained 47% of $MnCl_2$.

Figure 2B:
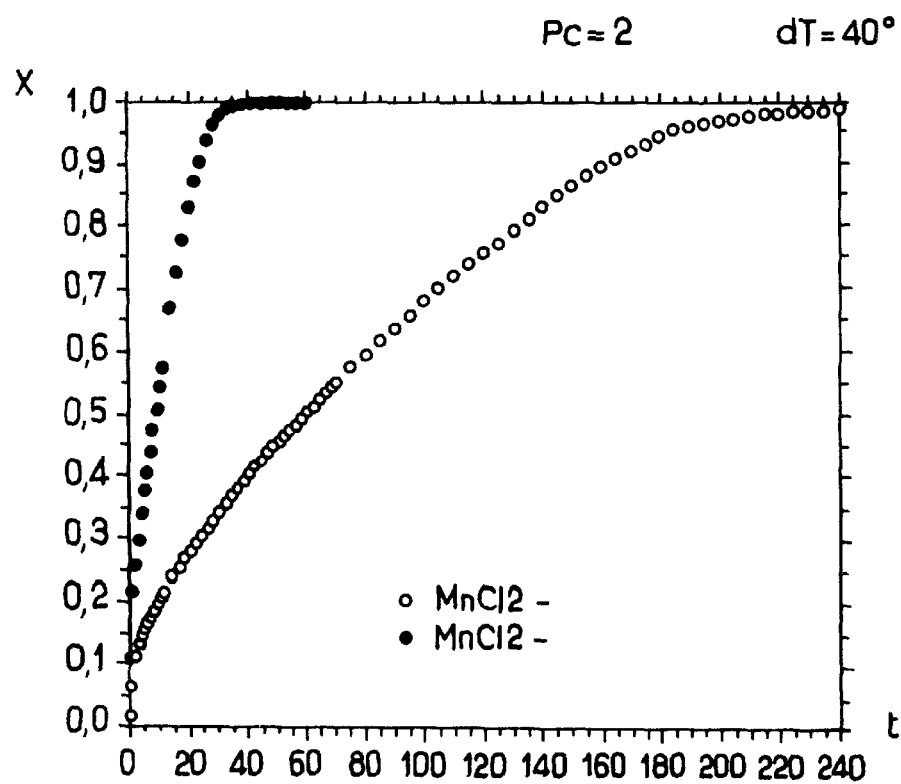

As follows from FIGS. 2A and 2B, the rate of conversion of the composite according to the invention is markedly higher, compared with that of the conventional prior art, because of a higher heat-exchange coefficient at the wall: 300 W/m$^2$ K in the case of the active composite according to the invention and only 30 W/m$^2$ K in the case of the prior composite. These values correspond to the initial values, before the beginning of the synthesis reaction. In the case of the prior composite, its conversion rate becomes higher after the time t=40 minutes because of the increase in the value of the wall exchange coefficient.

In a decomposition reaction the conversion rate of the active composite according to the invention is higher because the exchange coefficient at the wall does not deteriorate during the reaction, whereas it varies from 1200 W/m$^2$ K to 30 W/m$^2$ K in the case of the prior composite.

As a block of active composite is made up of sheets which are superposed over one another, various types of blocks can be prepared as a function of the application for which they are intended. In the simplest case a block of active composite is produced from sheets which have the same density, each sheet containing the same active agent in the same proportions. The block thus produced has a homogeneous structure.

It is also possible to employ sheets which have different densities to produce the block of active composite, for example in order to make a block whose density increases or decreases gradually across its thickness. This type of block can be produced from sheets of different densities, each containing the same active agent, either in the same proportions or in proportions which vary as a function of the density of the sheets.

In addition, by impregnating sheets with different active agents, preferably one active agent per sheet, it is possible to form blocks of active composite containing different active agents in regions of the block, and in predetermined proportions. This type of block can be advantageously produced from sheets of different densities.

Thus, according to the invention, it is possible to produce various types of active composite in which the density of the sheets, the nature of the active agent and its proportions in the block can be easily selected.

The active composite according to the invention thus exhibits better performance levels, given that it benefits from superior mechanical behaviour (small variation in the volume occupied by the reactant) and thus makes it possible to obtain heat exchange coefficients at the wall which are not limiting for the process.

These results show that the active composite according to the invention exhibits performance levels which are markedly superior to those of the active composite of the prior art.

We claim:

1. Active composite comprised of a compressed support and at least one agent which is active towards a gas, the compressed support including compressed expanded graphite which has a density of between 0.02 and 1.5 the active composite being formed from a plurality of sheets of compressed expanded graphite superposed over one another with the active agent being dispersed in the sheets, wherein the sheets of compressed expanded graphite have different densities.

2. Active composite according to claim 1, including sheets of a thickness of between 0.5 mm and 20 mm.

3. Active composite according to claim 1, including from 5 to 95% by weight of recompressed expanded graphite and from 95 to 5% by weight of active agent.

4. Active composite according to claim 1, exhibiting a thermal conductivity anisotropy.

5. Active composite according to claim 4, wherein in that the anisotropy coefficient $C_1/C_2$ is between 3 and 150.

6. Active composite according to claim 1, wherein its open porosity is between 32 and 99% of the total porosity of the composite.

7. Active composite according to claim 1, wherein the active agent is dispersed in the sheets in different proportions.

8. Process for making use of physicochemical processes using a gas and either a reactive solid or an adsorbent solid or a saturated or unsaturated absorbent liquid, or a solid acting as catalyst, or the seat of a condensation/evaporation of a gas, employing as reaction medium an active composite as claimed in claim 1.

9. Process according to claim 8, employing a reactive solid which is a salt.

10. Process according to claim 8, employing an adsorbent solid.

11. Process according to claim 8, employing a liquid absorbent for a gas.

12. Process according to claim 8, employing a reactive solid which is a metal.

13. Process according to claim 8, employing a solid acting as a catalyst.

14. Active composite comprised of a compressed support and at least one agent which is active towards a gas, the compressed support including compressed expanded graphite which has a density of between 0.02 and 1.5, the active composite being formed from a plurality of sheets of compressed expanded graphite superposed over one another with the active agent being dispersed in the sheets, wherein the sheets of compressed expanded graphite contain different active agents.

15. Active composite according to claim 14, including sheets of a thickness of between 0.5 mm and 20 mm.

16. Active composite according to claim 14, including from 5 to 95% by weight of recompressed expanded graphite and from 95 to 5% by weight of active agent.

17. Active composite according to claim 14, exhibiting a thermal conductivity anisotropy.

18. Active composite according to claim 14, wherein its open porosity is between 32 and 99% of the total porosity of the composite.

19. Active composite according to claim 14, wherein the active agent is dispersed in the sheets in different proportions.

20. A method of forming a physicochemical active agent comprising the steps of:

forming a plurality of sheets of compressed expanded graphite, impregnating said sheets with a physicochemical active agent, and superposing the impregnated sheets so as to form said active composite.

21. The method according to claim 20, wherein the sheets of compressed expanded graphite are formed by compressing expanded graphite in pulverulent form with rollers.

22. The method according to claim 21, wherein the sheets are impregnated by immersing them in a solution of the active agent and then dried to leave the active agent dispersed in the sheets.

23. The method according to claim 20, wherein the sheets of compressed expanded graphite are formed so as to have different densities.

24. The method according to claim 20, wherein the sheets are impregnated with different physicochemical active agents.

25. Process for making use of gas-solid or gas-liquid physicochemical processes, employing as reaction medium an active composite consisting of a compressed support and of at least one agent which is active towards a gas, the compressed support including recompressed expanded graphite which has a density of between 0.02 and 1.5 and including a series of sheets superposed over one another, the active agent being dispersed in the sheets.

26. Process according to claim 25, wherein the active agent is a salt.

27. Process according to claim 25, wherein the active agent is an adsorbent solid.

28. Process according to claim 25, wherein the active agent is a liquid absorbent for a gas.

29. Process according to claim 25, wherein the active agent is a metal.

* * * * *